United States Patent
Maekawa et al.

(10) Patent No.: US 9,464,586 B2
(45) Date of Patent: *Oct. 11, 2016

(54) EXHAUST GAS RECIRCULATION SYSTEM OF ENGINE

(71) Applicant: Mazda Motor Corporation, Aki-gun, Hiroshima (JP)

(72) Inventors: Kota Maekawa, Hiroshima (JP); Kenji Tanimura, Hiroshima (JP); Eiji Nakai, Hiroshima (JP); Motoshi Kataoka, Hiroshima (JP); Masanobu Kanno, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 125 days.

This patent is subject to a terminal disclaimer.

(21) Appl. No.: 14/470,805

(22) Filed: Aug. 27, 2014

(65) Prior Publication Data

US 2015/0089941 A1 Apr. 2, 2015

(30) Foreign Application Priority Data

Sep. 20, 2013 (JP) ................................. 2013-204094

(51) Int. Cl.
*F02B 33/44* (2006.01)
*F02M 25/07* (2006.01)
(Continued)

(52) U.S. Cl.
CPC ....... *F02D 41/0065* (2013.01); *F02B 29/0406* (2013.01); *F02D 41/0007* (2013.01);
(Continued)

(58) Field of Classification Search
CPC ............. F02D 41/0225; F02D 41/08; F02D 41/0007; F02D 41/0055; F02D 41/0065; F02D 41/10; F02D 2200/0414; F02D 13/0207; F02B 29/0406; F02M 25/0707; F02M 25/0709; F02M 25/0732

USPC ........ 60/605.2; 701/108; 123/568.11, 568.12
See application file for complete search history.

(56) References Cited

U.S. PATENT DOCUMENTS 7,717,099 B2 * 5/2010 Nagae ....................... F02D 9/04
123/568.21
7,937,213 B2 * 5/2011 Buis .................... F02D 41/0052
701/108

(Continued)

FOREIGN PATENT DOCUMENTS

JP 2007191973 A 11/2007
WO WO 2013076867 A1 * 5/2013 .......... F02D 41/0275

*Primary Examiner* — Thai Ba Trieu
(74) *Attorney, Agent, or Firm* — Alleman Hall McCoy Russell & Tuttle LLP (57) ABSTRACT

An exhaust gas recirculation control device of an engine is provided. The device includes: an exhaust turbocharger having a turbine disposed in an exhaust passage and a compressor disposed in an intake passage; an intercooler disposed in the intake passage downstream of the compressor; a low-pressure EGR passage connecting the exhaust passage downstream of the turbine to the intake passage upstream of the compressor; a low-pressure EGR valve disposed in the low-pressure EGR passage and for changing a cross-sectional area thereof; a high-pressure EGR passage connecting the exhaust passage upstream of the turbine to the intake passage downstream of the intercooler; a high-pressure EGR valve disposed in the high-pressure EGR passage and for changing a cross-sectional area thereof; a valve control device for controlling openings of the low-pressure and high-pressure EGR valves; and a gear range detector for detecting a gear range of a transmission.

13 Claims, 5 Drawing Sheets

(51) Int. Cl.
  *F02D 41/00*   (2006.01)
  *F02B 29/04*   (2006.01)
  *F02D 41/02*   (2006.01)
  *F02D 41/08*   (2006.01)
  *F02D 41/10*   (2006.01)
  *F02D 13/02*   (2006.01)

(52) U.S. Cl.
  CPC ....... *F02D41/0055* (2013.01); *F02D 41/0225* (2013.01); *F02D 41/08* (2013.01); *F02M 26/05* (2016.02); *F02M 26/06* (2016.02); *F02M 26/24* (2016.02); *F02M 26/25* (2016.02); *F02D 13/0207* (2013.01); *F02D 41/10* (2013.01); *F02D 2200/0414* (2013.01); *Y02T 10/144* (2013.01); *Y02T 10/146* (2013.01); *Y02T 10/47* (2013.01)

(56) References Cited

U.S. PATENT DOCUMENTS

| | | | | |
|---|---|---|---|---|
| 8,001,953 B2* | 8/2011 | Murata | ............... | F02D 41/0052 123/568.21 |
| 8,033,272 B2* | 10/2011 | Morizane | ............ | F02D 41/0007 123/565 |
| 8,036,806 B2* | 10/2011 | Nakamura | .......... | F02D 41/0007 701/102 |
| 8,196,404 B2* | 6/2012 | Onishi | ................. | F02D 41/0065 60/605.2 |
| 8,220,443 B2* | 7/2012 | Murata | ............... | F02D 41/0065 60/605.2 |
| 8,291,697 B2* | 10/2012 | Matsumoto | ......... | F02D 41/0275 60/295 |
| 8,555,615 B2* | 10/2013 | Murata | ..................... | F02D 9/04 60/285 |
| 9,010,113 B2* | 4/2015 | Harima | .............. | F02M 25/0702 60/605.2 |
| 2006/0137665 A1* | 6/2006 | Khair | ................. | F02M 25/0707 60/605.2 |
| 2007/0004555 A1* | 1/2007 | Berger | ................ | B60W 10/023 477/115 |
| 2008/0120013 A1* | 5/2008 | Yamaguchi | ........... | F02D 41/005 701/108 |
| 2009/0194079 A1* | 8/2009 | Nagae | ................. | F02D 41/0007 123/568.11 |
| 2009/0199824 A1* | 8/2009 | Buis | .................. | F02D 41/0052 123/568.21 |
| 2009/0223221 A1* | 9/2009 | Onishi | ................ | F02D 41/0065 123/568.11 |
| 2009/0283077 A1* | 11/2009 | Murata | ............... | F02D 41/0065 60/605.2 |
| 2010/0018187 A1* | 1/2010 | Matsumoto | ......... | F02B 29/0406 60/286 |
| 2010/0031939 A1* | 2/2010 | Ono | ........................ | F02D 41/08 60/605.2 |
| 2010/0050999 A1* | 3/2010 | Murata | ............... | F02D 41/0052 60/605.2 |
| 2010/0126142 A1* | 5/2010 | Murata | ..................... | F02D 9/04 60/285 |
| 2014/0216017 A1* | 8/2014 | Shirai | ................ | F02D 41/0275 60/297 |
| 2015/0059680 A1* | 3/2015 | Yoshida | .................... | F02D 9/04 701/102 |
| 2015/0089938 A1* | 4/2015 | Tanimura | ................ | F02D 41/0072 60/602 |
| 2015/0089942 A1* | 4/2015 | Kihara | ................ | F02D 41/0072 60/605.2 |
| 2015/0192087 A1* | 7/2015 | Shirahashi | .......... | F02D 41/0007 701/104 |

\* cited by examiner

EXHAUST GAS RECIRCULATION SYSTEM OF ENGINE

BACKGROUND

The present invention relates to an exhaust gas recirculation control device of an engine.

Conventionally, it has been known to provide a high-pressure EGR passage and a low-pressure EGR passage to recirculate a part of exhaust gas from an engine, from an exhaust passage to an intake passage. For example, JP2007-291973A discloses such a configuration. The high-pressure EGR passage connects a part of the exhaust passage upstream of a turbine of an exhaust turbocharger disposed therein, to a part of the intake passage downstream of a compressor of the exhaust turbocharger disposed therein (more specifically, downstream of an intercooler disposed downstream of the compressor). Moreover, the low-pressure EGR passage connects a part of the exhaust passage downstream of the turbine to a part of the intake passage upstream of the compressor. A low-pressure EGR valve for changing a cross-sectional area of the low-pressure EGR passage is disposed in the low-pressure EGR passage, and a high-pressure EGR valve for changing a cross-sectional area of the high-pressure EGR passage is disposed in the high-pressure EGR passage.

In JP2007-291973A, when the engine is in an idle operation, a flow rate of low-pressure EGR gas in the low-pressure EGR passage is increased to remove a deposit caused by condensed water, so that a deformation of the compressor and clogging of the intercooler due to the deposit are prevented.

Meanwhile, when the engine is in the idle operation, by keeping the turbine of the exhaust turbocharger rotated, a responsiveness to start (accelerating performance) of the vehicle improves. To keep the turbine rotated, an amount of exhaust gas recirculated by the low-pressure EGR passage is preferable to be increased as much as possible.

However, when the amount of exhaust gas recirculated by the low-pressure EGR passage is increased, condensed water is easily produced as disclosed in JP2007-291973A, then when the idle operation continues for a long period of time, the condensed water accumulates in the intercooler, and then when the engine stops in this state, there is a possibility that the condensed water will freeze.

SUMMARY

The present invention is made in view of the above situations and aims to improve a responsiveness of a vehicle to start and prevent accumulation of condensed water in an intercooler, in an exhaust gas recirculation control when an engine is in an idle operation.

According to one aspect to the present invention, an exhaust gas recirculation control device of an engine is provided. The control device includes an exhaust turbocharger, an intercooler, a low-pressure EGR passage, a low-pressure EGR valve, a high-pressure EGR passage, a high-pressure EGR valve, and a valve control device. The exhaust turbocharger has a turbine disposed in an exhaust passage of the engine and a compressor disposed in an intake passage. The intercooler is disposed in a part of the intake passage downstream of the compressor. The low-pressure EGR passage connects a part of the exhaust passage downstream of the turbine to a part of the intake passage upstream of the compressor. The low-pressure EGR valve is disposed in the low-pressure EGR passage and changes a cross-sectional area of the low-pressure EGR passage. The high-pressure EGR passage connects a part of the exhaust passage upstream of the turbine to a part of the intake passage downstream of the intercooler. The high-pressure EGR valve is disposed in the high-pressure EGR passage and changes a cross-sectional area of the high-pressure EGR passage. The valve control device controls openings of the low-pressure EGR valve and the high-pressure EGR valve. The exhaust gas recirculation control device also includes a gear range detector for detecting a gear range of a transmission of a vehicle in which the engine is installed. While the engine is in an idle operation, when the gear range detected by the gear range detector is a non-travel range, the valve control device controls the openings of the low-pressure EGR valve and the high-pressure EGR valve so that a ratio of an amount of exhaust gas recirculated by the high-pressure EGR passage with respect to a total amount of exhaust gas of the engine recirculated by the low-pressure EGR passage and the high-pressure EGR passage becomes higher than that when the detected gear range is a travel range.

With the above configuration, while the engine is in the idle operation, when the gear range of the transmission is the non-travel range (a P-range or an N-range), the ratio of the amount of exhaust gas recirculated by the high-pressure EGR passage with respect to the total amount of exhaust gas recirculated by the low-pressure and high-pressure EGR passages becomes higher than that when the transmission is in the travel range (e.g., a D-range or an R range). Thus, the amount of exhaust gas recirculated by the low-pressure EGR passage is reduced or becomes zero, and thereby, an accumulation of condensed water in the intercooler can be prevented. In this manner, when the gear range of the transmission is the non-travel range, even if the amount of exhaust gas recirculated by the low-pressure EGR passage is reduced, the driver's will to travel is low and a problem of a responsiveness of the vehicle to start does not occur. On the other hand, when the gear range of the transmission is the travel-range, by bringing the ratio low, the responsiveness of the vehicle to start can be improved. In addition, by filling the intake passage (especially, between the compressor and the intercooler) with the exhaust gas recirculated by the low-pressure EGR passage during the idle operation, the rate of the amount of exhaust gas recirculated by the high-pressure EGR passage can be reduced without reducing the total amount of exhaust gas recirculated by the low-pressure and high-pressure EGR passages, so as to secure an amount flowing through the turbine starting immediately after the start of the vehicle. Thereby, an exhaust emission control performance can also be improved. In this manner, when the gear range of the transmission is the travel range, even if the amount of exhaust gas recirculated by the low-pressure EGR passage is increased, since the possibility of the vehicle starting in a short period of time is high, the condensed water is unlikely to accumulate in the intercooler, and once the vehicle starts, the condensed water accumulated in the intercooler is introduced into the engine.

The exhaust gas recirculation control device may also include an intake air temperature detector for detecting a temperature of intake air introduced into the intake passage. While the engine is in the idle operation, when the temperature of intake air detected by the intake air temperature detector is lower than a predetermined temperature, the valve control device may control the opening of the low-pressure EGR valve to be 0% regardless of the gear range detected by the gear range detector.

Thereby, when the temperature of intake air (intake air temperature) is lower than the predetermined temperature (e.g., between 0° C. and 5° C.), in other words, when the condensed water easily accumulates in the intercooler and the condensed water easily freezes, the exhaust gas is not recirculated by the low-pressure EGR passage so that the condensed water can surely be prevented from accumulating in the intercooler and freezing.

The high-pressure EGR passage may include a cooler-side passage and a cooler bypass-side passage. In the cooler-side passage, a high-pressure EGR cooler for cooling the exhaust gas passing therethrough is disposed. The cooler bypass-side passage bypasses the high-pressure EGR cooler. The high-pressure EGR valve may include a cooler-side EGR valve and a cooler bypass-side EGR valve. The cooler-side EGR valve is disposed in the cooler-side passage and changes a cross-sectional area of the cooler-side passage. The cooler bypass-side EGR valve is disposed in the cooler bypass-side passage and changes a cross-sectional area of the cooler bypass-side passage. The exhaust gas recirculation control device may also include a coolant temperature detector for detecting a temperature of a coolant of the engine. The valve control device may control the opening of the cooler-side EGR valve to be 0% in a case where the exhaust gas is recirculated by the high-pressure EGR passage when the temperature of the coolant detected by the coolant temperature detector is lower than a predetermined temperature set in advance while the engine is in the idle operation.

Specifically, when the temperature of the coolant (coolant temperature) is lower than the predetermined temperature (e.g., between 50° C. and 60° C.), in other words, while the engine is cold before the warming up is completed, condensed water is produced at the position of the cooler-side passage where the high-pressure EGR cooler is disposed, is mixed with soot, and produces a deposit. Especially since the exhaust gas flowing in the high-pressure EGR passage has not yet passed through an exhaust emission control system, a large amount of soot is contained in the exhaust gas, therefore the deposit easily occurs, resulting in clogging the cooler-side passage. Thus, when the coolant temperature is lower than the predetermined temperature, by setting the opening of the cooler-side EGR valve to 0%, the clogging of the cooler side passage due to the soot can be prevented.

While the engine is in the idle operation, in a case where the gear range detected by the gear range detector is the travel range and the detected gear range has continuously been the travel range for over a predetermined period of time, the valve control device may control the openings of the low-pressure EGR valve and the high-pressure EGR valve so that the ratio becomes the same ratio as when the detected gear range is the non-travel range.

Thereby, in the case where the gear range has continuously been the travel range for over the predetermined period of time, by setting the ratio as high as that in the non-travel range, the accumulation of a large amount of condensed water in the intercooler can be prevented.

The exhaust gas recirculation control device may also include a drive transmitting power reducer for reducing a drive transmitting power of the transmission when the gear range of the transmission is the travel range and a brake pedal is pressed while the engine is in the idle operation. While the engine is in the idle operation, in a case where the gear range detected by the gear range detector is the travel range and the drive transmitting power is reduced by the drive transmitting power reducer, the valve control device may control the openings of the low-pressure EGR valve and the high-pressure EGR valve so that the ratio becomes the same ratio as when the detected gear range is the non-travel range.

Specifically, even if the gear range is the travel-range, when the drive transmitting power of the transmission is reduced by the drive transmitting power reducer, since the brake pedal is pressed, the driver's will to travel can be considered low. Thus, also in this case, by setting the ratio as high as that in the non-travel range, the accumulation of condensed water in the intercooler can be prevented as much as possible.

DETAILED DESCRIPTION OF EMBODIMENT

Hereinafter, one embodiment of the present invention is described in detail with reference to the appended drawings.

Figure 1:
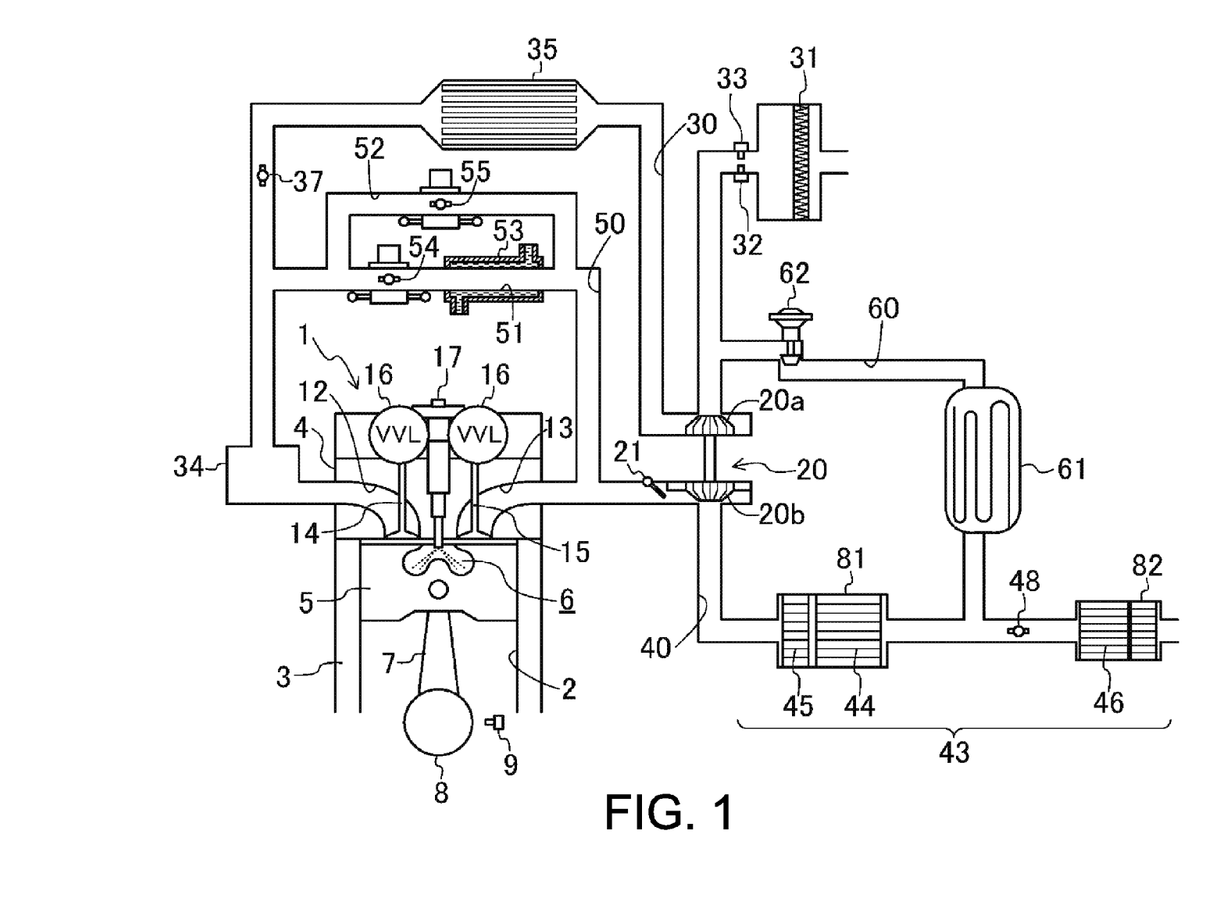
FIG. 1 is a schematic view illustrating a configuration of an engine controlled by an exhaust gas recirculation control device according to one embodiment of the present invention.

FIG. 1 is a schematic view illustrating a configuration of an engine 1 controlled by an exhaust gas recirculation control device of this embodiment. The engine 1 is a diesel engine installed in a vehicle, and includes a cylinder block 3 formed with a plurality of cylinders 2 (only one is illustrated in FIG. 1), and a cylinder head 4 disposed on the cylinder block 3. A piston 5 is reciprocatably fitted into each of the cylinders 2 of the engine 1, and a deep-bowl combustion chamber 6 is formed in a top face of the piston 5. The piston 5 is coupled to a crankshaft 8 via a connecting rod 7. The engine 1 is provided with an engine speed sensor 9 for detecting a speed of the engine 1 by detecting a rotational angular position of the crankshaft 8.

In the cylinder head 4, an intake port 12 and an exhaust port 13 are formed for each cylinder 2, and an intake valve 14 for opening and closing an opening of the intake port 12 on the combustion chamber 6 side and an exhaust valve 15 for opening and closing an opening of the exhaust port 13 on the combustion chamber 6 side are disposed.

Moreover, injectors 17 for injecting fuel are provided in the cylinder head 4. Each injector 17 is arranged such that its fuel injection port is oriented toward an inside of the combustion chamber 6 from a ceiling face of the combustion chamber 6, and to directly inject the fuel into the combustion chamber 6 near a compression top dead center.

The engine 1 is provided with variable valve lift mechanisms (hereinafter, referred to as VVL) 16 for adjusting lifts of the intake and exhaust valves 14 and 15. The VVLs 16 can respectively adjust the lifts of the intake and exhaust valves 14 and 15 so that the valves are fully closed or substantially fully closed.

An intake passage 30 is connected to one side face of the engine 1 to communicate with the intake ports 12 of the respective cylinders 2. An air cleaner 31 for filtering intake air is disposed in an upstream end part of the intake passage 30, and the intake air filtered by the air cleaner 31 is supplied to each combustion chamber 6 of the cylinder 2 via the intake passage 30 and the intake port 12.

An airflow sensor 32 for detecting a flow rate of the intake air introduced into the intake passage 30, and an intake air temperature sensor 33 (intake air temperature detector) for detecting a temperature of the intake air (intake air temperature) are disposed in the intake passage 30, near a downstream side of the air cleaner 31. Moreover, a surge tank 34 is disposed in the intake passage 30, near its downstream end. A part of the intake passage 30 downstream of the surge tank 34 is formed to be independent passages extending to the respective cylinders 2 and a downstream end of each independent passage is connected to the intake port 12 of the cylinder 2.

Further, a compressor 20a of an exhaust turbocharger 20 is disposed in the intake passage 30, between either one of the airflow sensor 32 and the intake air temperature sensor 33, and the surge tank 34. The intake air is turbocharged by the operation of the compressor 20a.

Furthermore, an intercooler 35 for cooling air compressed by the compressor 20a and an intake shutter valve 37 are disposed in the intake passage 30, between the compressor 20a of the exhaust turbocharger 20 and the surge tank 34, in this order from the upstream side. The intake shutter valve 37 adjusts an amount of intake air to the combustion chambers 6 of the respective cylinders 2, by changing a cross-sectional area of the intake passage 30 at the position where the intake shutter valve 37 is disposed.

An exhaust passage 40 through which exhaust gas from the combustion chambers 6 of the respective cylinders 2 is discharged is connected to the other side face of the engine 1. An upstream part of the exhaust passage 40 is comprised of an exhaust manifold having independent passages extending to the respective cylinders 2 and connected to respective external ends of the exhaust ports 13, and a merging part where the independent passages merge. In a part of the exhaust passage 40 downstream of the exhaust manifold, a turbine 20b of the exhaust turbocharger 20 is disposed. The turbine 20b rotates by the exhaust gas flow, and the compressor 20a coupled to the turbine 20b is operated by the rotation of the turbine 20b.

A VGT (variable-geometry turbocharger) throttle valve 21 is provided in the exhaust passage 40 near the upstream side of the turbine 20b. By controlling an opening (throttle amount) of the VGT throttle valve 21, a flow speed of the exhaust gas to the turbine 20b can be adjusted, and thus, a rotational speed of the turbine 20b which rotates by the exhaust gas flow, in other words, a compression ratio of the compressor 20a of the exhaust turbocharger 20 (a ratio of a gas pressure immediately after flowing out from the compressor 20a with respect to a gas pressure immediately before flowing into the compressor 20a) can be adjusted.

An exhaust emission control system 43 for purifying hazardous components within the exhaust gas is disposed in the exhaust passage 40, downstream of the turbine 20b of the exhaust turbocharger 20. The exhaust emission control system 43 includes a particulate filter 44, an oxidative catalyst 45, and a lean $NO_x$ catalyst 46. The particulate filter 44 captures particulate matters (e.g., soot) within the exhaust gas. The oxidative catalyst 45 is disposed upstream of the particulate filter 44, carries, for example, platinum or a mixture of platinum with palladium, and oxidizes CO and HC (hydrocarbons) within the exhaust gas. The lean $NO_x$ catalyst 46 is disposed downstream of the particulate filter 44, processes (traps) $NO_x$ within the exhaust gas, and suppresses discharge of $NO_x$ to the atmosphere. The particulate filter 44 and the oxidative catalyst 45 are contained in a first case 81. The lean $NO_x$ catalyst 46 is contained in a second case 82, different from the first case 81. The second case 82 is disposed separately toward the downstream side from the first case 81.

The engine 1 is configured such that a part of the exhaust gas is recirculated from the exhaust passage 40 to the intake passage 30. A high-pressure EGR passage 50 and a low-pressure EGR passage 60 are provided for the recirculation of the exhaust gas.

The high-pressure EGR passage 50 connects a part of the exhaust passage 40 upstream of the turbine 20b of the exhaust turbocharger 20 to a part of the intake passage 30 downstream of the intercooler 35. More specifically, the high-pressure EGR passage 50 connects a part of the exhaust passage 40 between the exhaust manifold and the turbine 20b of the exhaust turbocharger 20 to a part of the intake passage 30 between the intake shutter valve 37 and the surge tank 34.

The high-pressure EGR passage 50 includes a cooler-side passage 51 for cooling and recirculating the exhaust gas, and a cooler bypass-side passage 52 for recirculating the exhaust gas with its temperature remaining as it is. The cooler-side passage 51 is provided with a high-pressure EGR cooler 53 for cooling the exhaust gas passing thereinside. The cooler bypass-side passage 52 is a passage bypassing the high-pressure EGR cooler 53. Moreover, a cooler-side EGR valve 54 for changing a cross-sectional area of the cooler-side passage 51 is disposed in the cooler-side passage 51 downstream of the high-pressure EGR cooler 53, and a cooler bypass-side EGR valve 55 for changing a cross-sectional area of the cooler bypass-side passage 52 is disposed in the cooler bypass-side passage 52. The cooler-side EGR valve 54 and the cooler bypass-side EGR valve 55 together configure a high-pressure EGR valve and adjust the amount of exhaust gas recirculated by the high-pressure EGR passage 50 (the cooler-side passage 51 and the cooler bypass-side passage 52).

The low-pressure EGR passage 60 connects a part of the exhaust passage 40 downstream of the turbine 20b to a part of the intake passage 30 upstream of the compressor 20a. More specifically, the low-pressure EGR passage 60 connects a part of the exhaust passage 40 between the particulate filter 44 and the lean $NO_x$ catalyst 46 (a part between the first case 81 and the second case 82) to a part of the intake passage 30 between either one of the airflow sensor 32 and the intake air temperature sensor 33, and the compressor 20a. A low-pressure EGR cooler 61 for cooling the exhaust gas passing thereinside is disposed in the low-pressure EGR passage 60. Moreover, a low-pressure EGR valve 62 for changing a cross-sectional area of the low-pressure EGR passage 60 is disposed in the low-pressure EGR passage 60 downstream of the low-pressure EGR cooler 61.

An exhaust shutter valve 48 is disposed in the exhaust passage 40 downstream of the connected part to the low-pressure EGR passage 60 (and upstream of the lean $NO_x$ catalyst 46). The exhaust shutter valve 48 changes a cross-sectional area of the part of the exhaust passage 40 where the exhaust shutter valve 48 is disposed, and when the cross-sectional area becomes smaller (an opening of the exhaust shutter valve 48 becomes smaller), a pressure in the part of the exhaust passage 40 connected to the low-pressure EGR passage 60 increases and a difference between pressures on the exhaust passage 40 side and the intake passage 30 side of the low-pressure EGR valve 62 in the low-pressure EGR passage 60 becomes large. Therefore, by controlling an opening of the low-pressure EGR valve 62 and the opening of the exhaust shutter valve 48, the amount of exhaust gas recirculated by the low-pressure EGR passage 60 is adjusted. Note that the exhaust shutter valve 48 is not essential and may be omitted.

Figure 2:
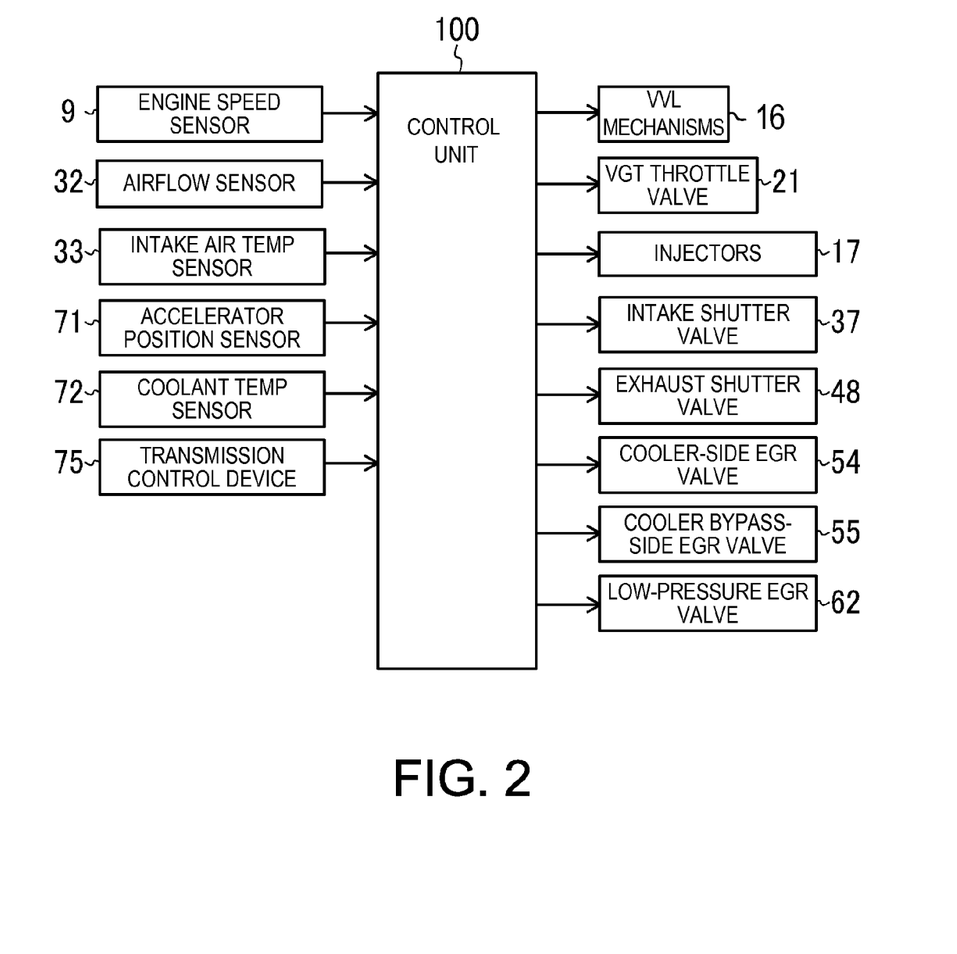
FIG. 2 is a block diagram illustrating a configuration of a control system of the exhaust gas recirculation control device.

As illustrated in FIG. 2, signals of values of sensors including the engine speed sensor 9, the airflow sensor 32, the intake air temperature sensor 33, an accelerator position sensor 71 for detecting an accelerator position, and a coolant temperature sensor 72 (coolant temperature detector) for detecting a temperature of a coolant of the engine 1 (coolant temperature) are inputted to a control unit 100 for controlling the engine 1. Moreover, the control unit 100 receives, from a transmission control device 75 for controlling an automatic transmission of the vehicle, a signal relating to information on a current gear range of the automatic transmission. Thus, the transmission control device 75 configures a gear range detector for detecting the gear range of the transmission of the vehicle in which the engine 1 is installed.

In this embodiment, while the engine 1 is in an idle operation, when the transmission is in a travel range (e.g., a D-range or a R-range) and a brake pedal is stepped on, the transmission control device 75 performs a neutral control in which a drive transmitting power of the transmission is reduced to be close to neutral. Thus, the transmission control device 75 configures a drive transmitting power reducer. The neutral control is performed by slipping a clutch of the transmission in a fastened state (a clutch that is in a completely fastened state when the neutral control is not performed). Thus, a creep force decreases and a driver of the vehicle can maintain the vehicle in a stopped state by lightly stepping on the brake pedal.

While the transmission control device 75 performs the neutral control, it outputs a neutral-control-in-process signal to the control unit 100, in other words, the control unit 100 also receives the neutral-control-in-process signal.

The control unit 100 is a controller based on a well-known microcomputer, and includes a central processing unit (CPU) for executing program(s), a memory comprised of, for example, a RAM and/or a ROM and for storing the program(s) and data, and an input/output (I/O) bus for inputting and outputting electric signals.

Further, based on the input signals, the control unit 100 controls the VVLs 16, the injectors 17, the VGT throttle valve 21, the intake shutter valve 37, the exhaust shutter valve 48, the cooler-side EGR valve 54, the cooler bypass-side EGR valve 55, and the low-pressure EGR valve 62.

According to an operating state of the engine 1, the control unit 100 determines a low-pressure EGR target recirculation amount which is a target value of the amount of exhaust gas recirculated by the low-pressure EGR passage 60, and a high-pressure EGR target recirculation amount which is a target value of the amount of exhaust gas recirculated by the high-pressure EGR passage 50. In this embodiment, based on the signals from the engine speed sensor 9 and the accelerator position sensor 71, in other words, based on an engine speed Ne and an engine load PE, the control unit 100 determines the low-pressure EGR target recirculation amount and the high-pressure EGR target recirculation amount, according to the map in FIG. 3.

Figure 3:
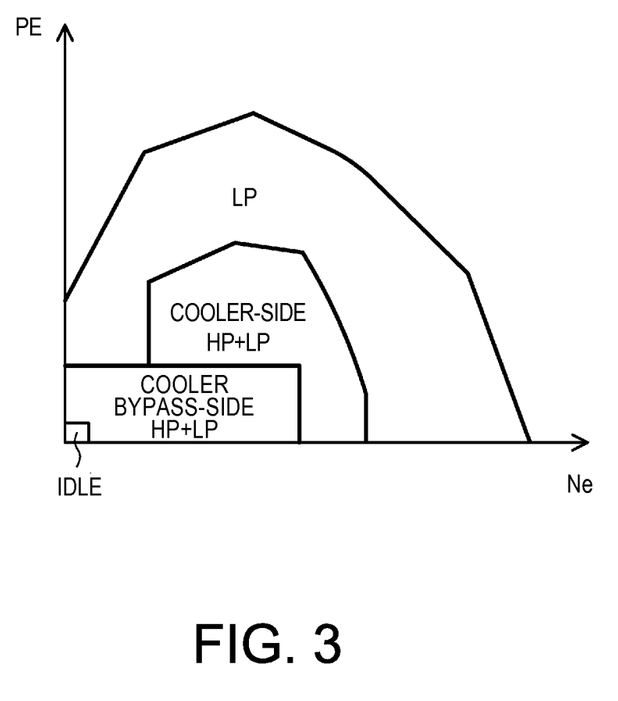
FIG. 3 is a view illustrating a map for determining a low-pressure EGR target recirculation amount and a high-pressure EGR target recirculation amount based on an engine speed and an engine load.

An "LP" region of the map where either one of the engine load and the engine speed is high is a region where the exhaust gas is recirculated only by the low-pressure EGR passage 60. In the "LP" region of the map, the low-pressure EGR target recirculation amount is set in advance based on the engine speed Ne and the engine load PE, and the high-pressure EGR target recirculation amount is set to zero in advance. Thus, the cooler-side EGR valve 54 and the cooler bypass-side EGR valve 55 are fully closed so that all the exhaust gas is led to the turbine 20b of the exhaust turbocharger 20 and turbocharged in a high engine load range where a high torque is needed. This is because the recirculation of exhaust gas by the high-pressure EGR passage 50 can hardly be performed since the pressure ratio of the compressor 20a of the exhaust turbocharger 20 is high, a difference between pressures on the exhaust passage 40 side and the intake passage 30 side of the cooler-side EGR valve 54 in the cooler-side passage 51 is small, and a difference between pressures on the exhaust passage 40 side and the intake passage 30 side of the cooler bypass-side EGR valve 55 in the cooler bypass-side passage 52 is also small.

A "cooler-side HP+LP" region of the map where either one of the engine load and the engine speed is medium is a region where the exhaust gas is recirculated by the cooler-side passage 51 of the high-pressure EGR passage 50 and the low-pressure EGR passage 60, but not by the cooler bypass-side passage 52 (the cooler bypass-side EGR valve 55 is fully closed). In the "cooler-side HP+LP" region of the map, the low-pressure EGR target recirculation amount and the high-pressure EGR target recirculation amount are set in advance based on the engine speed Ne and the engine load PE.

A "cooler bypass-side HP+LP" region of the map where either one of the engine load and the engine speed is low is a region where the exhaust gas is recirculated by the cooler bypass-side passage 52 of the high-pressure EGR passage 50 and the low-pressure EGR passage 60 but not by the cooler-side passage 51 (the cooler-side EGR valve 54 is fully closed). In the "cooler bypass-side HP+LP" region of the map, the low-pressure EGR target recirculation amount and the high-pressure EGR target recirculation amount are set in advance based on the engine speed Ne and the engine load PE.

The control unit 100 controls the openings of the low-pressure EGR valve 62, the exhaust shutter valve 48, the cooler-side EGR valve 54, and the cooler bypass-side EGR valve 55 so that the amount of exhaust gas recirculated by the low-pressure and high-pressure EGR passages 60 and 50 becomes the low-pressure and high-pressure EGR target recirculation amounts set in advance in the map, respectively. Thus, the control unit 100 configures a valve control device.

In this embodiment, in the map, an "idle" region applied to the idle operation of the engine 1 is also provided, and in the "idle" region, the low-pressure EGR target recirculation amount and the high-pressure EGR target recirculation amount, which are different from each other, are set in advance depending on whether the gear range of the automatic transmission inputted from the transmission control device 75 is the travel range (e.g., the D-range or the R-range) or a non-travel range (e.g., a P-range or an N-range).

Specifically, while the engine 1 is in the idle operation, when the automatic transmission is in the non-travel range, the control unit 100 controls the openings of the low-pressure EGR valve 62, the exhaust shutter valve 48, and the high-pressure EGR valve (the cooler-side EGR valve 54 and the cooler bypass-side EGR valve 55) so that a ratio of the amount of exhaust gas recirculated by the high-pressure EGR passage 50 with respect to a total amount of exhaust gas recirculated by the low-pressure and high-pressure EGR passages 60 and 50 becomes higher compared to when the automatic transmission is in the travel range. Note that in this embodiment, the opening of the exhaust shutter valve 48 is always fixed while the engine 1 is in the idle operation.

In this embodiment, while the engine 1 is in the idle operation, when the automatic transmission is in the non-travel range, the ratio is set to 100%. In other words, the low-pressure EGR target recirculation amount for this case is set to zero in advance, and the opening of the low-pressure EGR valve 62 is set to 0% so that the exhaust gas is recirculated only by the high-pressure EGR passage 50 (not by the low-pressure EGR passage 60).

Here, the recirculation of the exhaust gas by the high-pressure EGR passage 50 is basically performed, similarly to the "cooler bypass-side HP+LP" region, by the cooler bypass-side passage 52 (the opening of the cooler-side EGR valve 54 is set to 0%); however, the recirculation of the exhaust gas by the high-pressure EGR passage 50 may be performed by using the cooler-side passage 51 in combination or alone. Note that in a case of recirculating the exhaust gas by the high-pressure EGR passage 50 when the coolant temperature detected by the coolant temperature sensor 72 is lower than a predetermined temperature (e.g., between 50° C. and 60° C.), in other words, while the engine is cold before the warming up is completed, it is preferable to set the opening of the cooler-side EGR valve 54 to 0%. This is because when the coolant temperature is lower than the predetermined temperature, condensed water is produced at the position of the cooler-side passage 51 where the high-pressure EGR cooler 53 is disposed, is mixed with soot, and produces a deposit. Especially since the exhaust gas flowing in the high-pressure EGR passage 50 has not yet passed through the exhaust emission control system 43, a large amount of soot is contained in the exhaust gas, and therefore the deposit easily occurs, resulting in clogging the cooler-side passage 51. Therefore, the opening of the cooler-side EGR valve 54 is set to 0% to prevent the clogging.

On the other hand, when the automatic transmission is in the travel range, the ratio is set to be higher than 0% but lower than 100%, and the exhaust gas is recirculated by the low-pressure and high-pressure EGR passages 60 and 50. The recirculation of the exhaust gas by the high-pressure EGR passage 50 in this case is performed, similarly to the non-travel range, by the cooler bypass-side passage 52 (the opening of the cooler-side EGR valve 54 is set to 0%). As described above, particularly when the coolant temperature is lower than the predetermined temperature, it is preferable to perform the recirculation in this manner.

When the automatic transmission is in the travel range, in view of the responsiveness of the vehicle to start, the ratio is preferable to be low, but in view of preventing the accumulation of the condensed water in the intercooler 35, the ratio is preferable to be high. Thus, the ratio is set in view of these factors. Here, since the automatic transmission is in the travel range, the driver's will to travel can be considered high; therefore, the responsiveness of the vehicle to start is preferable to be taken more into consideration.

Figure 4:
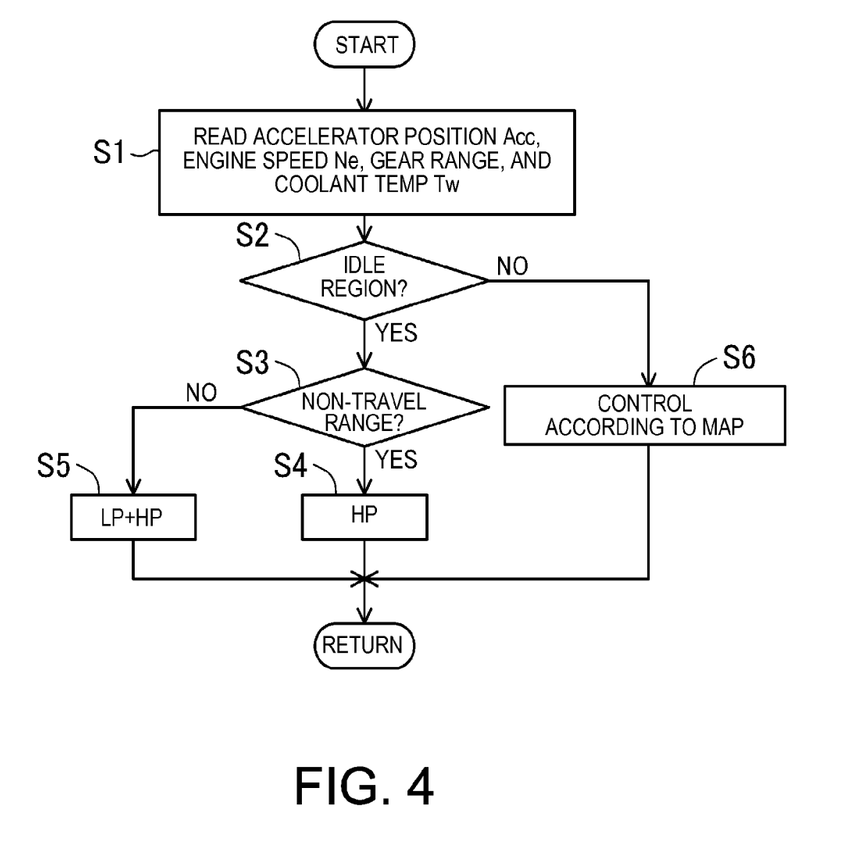
FIG. 4 is a flowchart illustrating an exhaust gas recirculation control operation performed by a control unit.

The exhaust gas recirculation control operation performed by the control unit 100 is described based on the flowchart in FIG. 4.

First, at S1, an accelerator position Acc from the accelerator position sensor 71, the engine speed Ne from the engine speed sensor 9, the gear range of the automatic transmission from the transmission control device 75, and a coolant temperature Tw from the coolant temperature sensor 72 are read.

Next, at S2, according to the map in FIG. 3, whether the operating state of the engine 1 is in the "idle" region is determined based on the engine speed Ne and the accelerator position Acc (corresponding to the engine load PE), and if the result at S2 is positive, the operation proceeds to S3; whereas if the result at S2 is negative, the operation proceeds to S6.

At S3, whether the automatic transmission is in the non-travel range is determined. If the result at S3 is positive, the operation proceeds to S4 to control the openings of the low-pressure EGR valve 62, the exhaust shutter valve 48, the cooler-side EGR valve 54, and the cooler bypass-side EGR valve 55 so that the exhaust gas is recirculated only by the high-pressure EGR passage 50, and the operation returns to START thereafter.

Whereas if the result at S3 is negative, the operation proceeds to S5 to control the openings of the low-pressure EGR valve 62, the exhaust shutter valve 48, the cooler-side EGR valve 54, and the cooler bypass-side EGR valve 55 so that the exhaust gas is recirculated by the low-pressure and high-pressure EGR passages 60 and 50, and the operation returns to START thereafter.

At S6 to which the operation proceeds when the result at S2 is negative, the openings of the low-pressure EGR valve 62, the exhaust shutter valve 48, the cooler-side EGR valve 54, and the cooler bypass-side EGR valve 55 are controlled according to the map, and the operation returns to START thereafter.

Therefore, in the exhaust gas recirculation control, while the engine 1 is in the idle operation, when the automatic transmission is in the non-travel range, since the exhaust gas is recirculated only by the high-pressure EGR passage 50, the accumulation of the condensed water in the intercooler 35 can be prevented. Even if the exhaust gas is not recirculated by the low-pressure EGR passage 60 as described above, since the driver's will to travel is low when the automatic transmission is in the non-travel range, a problem of the responsiveness of the vehicle to start does not occur. On the other hand, when the automatic transmission is in the travel range, since the exhaust gas is recirculated by the low-pressure and high-pressure EGR passages, the responsiveness of the vehicle to start can be improved. Even if the exhaust gas is recirculated by the low-pressure EGR passage 60 when the automatic transmission is in the travel range as described above, since the possibility of the vehicle starting in a short period of time is high, the condensed water is unlikely to accumulate in the intercooler 35, and once the vehicle starts, the condensed water accumulated in the intercooler 35 is introduced into the engine.

Figure 5:
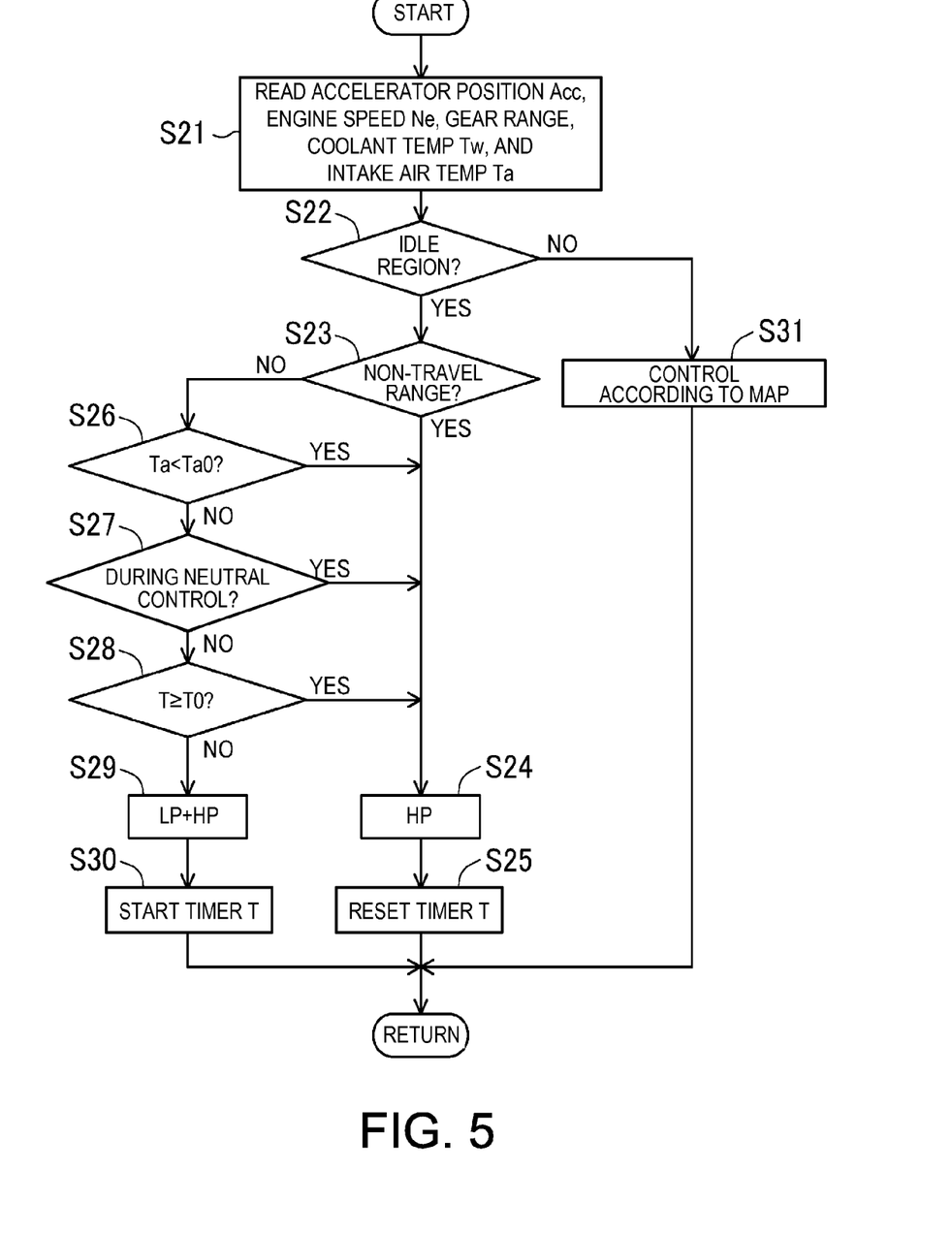
FIG. 5 is a flowchart illustrating another exhaust gas recirculation control operation performed by the control unit.

FIG. 5 is a flowchart illustrating another exhaust gas recirculation control operation performed by the control unit. In this exhaust gas recirculation control, even if the automatic transmission is in the travel range, there is a case where the exhaust gas is recirculated only by the high-pressure EGR passage 50 similarly to the non-travel range.

Specifically, first, at S21, the accelerator position Acc from the accelerator position sensor 71, the engine speed Ne from the engine speed sensor 9, the gear range of the automatic transmission from the transmission control device 75, the coolant temperature Tw from the coolant temperature sensor 72, and an intake air temperature Ta from the intake air temperature sensor 33 are read. Note that when the transmission control device 75 outputs the neutral-control-in-process signal, the neutral-control-in-process signal is inputted.

Next, at S22, according to the map in FIG. 3, whether the operating state of the engine 1 is in the "idle" region is determined based on the engine speed Ne and the accelerator position Acc (corresponding to the engine load PE), and if the result at S22 is positive, the operation proceeds to S23; whereas if the result at S22 is negative, the operation proceeds to S31.

At S23, whether the automatic transmission is in the non-travel range is determined. If the result at S23 is positive, the operation proceeds to S24 to control the openings of the low-pressure EGR valve 62, the exhaust shutter valve 48, the cooler-side EGR valve 54, and the cooler bypass-side EGR valve 55 so that the exhaust gas is recirculated only by the high-pressure EGR passage 50. Next, at S25, a timer T is reset, and the operation returns to START thereafter. The timer T is for counting, when the automatic transmission is in the travel range, a period of time in which the automatic transmission remains in the travel range.

Whereas if the result at S23 is negative, the operation proceeds to S26 to determine whether the intake air temperature Ta is lower than a predetermined temperature Ta0. If the result at S26 is positive, the operation proceeds to S24; whereas if the result at S26 is negative, the operation proceeds to S27 to determine whether the neutral control is currently performed by the transmission control device 75. If the result at S27 is positive, the operation proceeds to S24; whereas if the result at S27 is negative, the operation proceeds to S28 to determine whether the timer T that is started at S30 described later indicates longer than a predetermined period of time T0.

If the result at S28 is positive, the operation proceeds to S24; whereas if the result at S28 is negative, the operation proceeds to S29 to control the openings of the low-pressure EGR valve 62, the exhaust shutter valve 48, the cooler-side EGR valve 54, and the cooler bypass-side EGR valve 55 so that the exhaust gas is recirculated by the low-pressure and high-pressure EGR passages 60 and 50. Next, at S30, the timer T is started, and the operation returns to START thereafter.

At S31 to which the operation proceeds when the result at S22 is negative, the openings of the low-pressure EGR valve 62, the exhaust shutter valve 48, the cooler-side EGR valve 54, and the cooler bypass-side EGR valve 55 are controlled according to the map, and the operation returns to START thereafter.

By the other exhaust gas recirculation control, even if the automatic transmission is in the travel range, the ratio described above is set to be the same as that in the non-travel range (in the other exhaust gas recirculation control, 100%) in any one of the case where the intake air temperature Ta from the intake air temperature sensor 33 is lower than the predetermined temperature Ta0, the case where the neutral control is being performed by the transmission control device 75, and the case where the automatic transmission has remained in the travel range for over the predetermined time period T0.

In other words, in the case where the intake air temperature Ta is lower than the predetermined temperature Ta0 (e.g., between 0° C. and 5° C.), although the condensed water easily accumulates in the intercooler 35 and the condensed water easily freezes, the exhaust gas is not recirculated by the low-pressure EGR passage 60 so that the condensed water can be surely prevented from accumulating in the intercooler 35 and freezing.

Moreover, in the case where the neutral control is being performed by the transmission control device 75, since the brake pedal is stepped on, the driver's will to travel can be considered low. Therefore, in this case, by setting the ratio as high as that in the non-travel range (in the other exhaust gas recirculation control, 100%), the accumulation of condensed water in the intercooler 35 can be prevented as much as possible.

Further, in the case where the automatic transmission has remained in the travel range for over the predetermined time period T0, although the possibility of a large amount of condensed water accumulating in the intercooler 35 becomes high, in this case, by setting the ratio as high as that in the non-travel range (in the other exhaust gas recirculation control, 100%), the accumulation of the large amount of condensed water in the intercooler 35 can be prevented.

The present invention is not limited to this embodiment, and may be modified without deviating from the spirit and scope of the claims.

For example, in this embodiment, the exhaust gas is recirculated only by the high-pressure EGR passage 50 when the automatic transmission is in the non-travel range; however, the exhaust gas may be recirculated by the low-pressure and high-pressure EGR passages 60 and 50. In this case, the ratio in the non-travel range may be lower than 100% and higher than that in the travel range. In such a case, even if the automatic transmission is in the travel range, in any one of the case where the intake air temperature Ta is lower than the predetermined temperature Ta0, the case where the neutral control is being performed by the transmission control device 75, and the case where the automatic transmission has remained in the travel range for over the predetermined time period T0, the ratio may be set to be the same as that in the non-travel range. Note that when the intake air temperature Ta is lower than the predetermined temperature Ta0, regardless of the gear range, the opening of the low-pressure EGR valve 62 is preferable to be set to 0%.

Moreover, in this embodiment, only one exhaust turbocharger 20 is provided for the engine 1; however, two or more exhaust turbochargers may be provided. In this case, the low-pressure EGR passage 60 connects the part of the exhaust passage 40 downstream of the turbine positioned the furthest downstream among all the turbines, to the part of the intake passage 30 upstream of the compressor positioned the furthest upstream among all the compressors. Moreover, the high-pressure EGR passage 50 connects the part of the exhaust passage 40 upstream of the turbine positioned the furthest upstream among all the turbines, to the part of the intake passage 30 downstream of the intercooler 35 positioned further downstream of the compressor which is positioned the furthest downstream among all the compressors.

The above-described embodiment is merely an illustration, and therefore, it must not be interpreted in a limited way. The scope of the present invention is defined by the following claims, and all of modifications and changes falling under the equivalent range of the claims are within the scope of the present invention.

The present invention is effective for an exhaust gas recirculation control device for an engine, which includes an exhaust turbocharger having a turbine disposed in an exhaust passage of the engine and a compressor disposed in an intake passage, an intercooler disposed in a part of the intake passage downstream of the compressor, a low-pressure EGR passage connecting a part of the exhaust passage downstream of the turbine to a part of the intake passage upstream of the compressor, a low-pressure EGR valve disposed in the low-pressure EGR passage and for changing a cross-sectional area of the low-pressure EGR passage, a high-pressure EGR passage connecting a part of the exhaust passage upstream of the turbine to a part of the intake passage downstream of the intercooler, a high-pressure EGR valve disposed in the high-pressure EGR passage and for changing a cross-sectional area of the high-pressure EGR passage, and a valve control device for controlling openings of the low-pressure EGR valve and the high-pressure EGR valve.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine
20 Exhaust Turbocharger
20a Compressor
20b Turbine
30 Intake Passage
33 Intake Air Temperature Sensor (Intake Air Temperature Detector)
40 Exhaust Passage
48 Exhaust Shutter Valve
50 High-pressure EGR Passage
51 Cooler-side Passage
52 Cooler Bypass-side Passage
53 High-pressure EGR Cooler
54 Cooler-side EGR Valve (High-pressure EGR Valve)
55 Cooler Bypass-side EGR Valve (High-pressure EGR Valve)
60 Low-pressure EGR Passage
62 Low-pressure EGR Valve
72 Coolant Temperature Sensor (Coolant Temperature Detector)
75 Transmission Control Device (Gear Range Detector) (Drive Transmitting Power Reducer)
100 Control Unit (Valve Control Device)

What is claimed is:

1. A turbocharged internal combustion engine having an exhaust gas recirculation (EGR) control system of an engine, the control system comprising:
    an exhaust turbocharger having a turbine disposed in an exhaust passage of the engine and a compressor disposed in an intake passage;
    an intercooler disposed in a part of the intake passage downstream of the compressor;
    a low-pressure EGR passage connecting a part of the exhaust passage downstream of the turbine to a part of the intake passage upstream of the compressor;
    a low-pressure EGR valve disposed in the low-pressure EGR passage and for changing a cross-sectional area of the low-pressure EGR passage;
    a high-pressure EGR passage connecting a part of the exhaust passage upstream of the turbine to a part of the intake passage downstream of the intercooler;
    a high-pressure EGR valve disposed in the high-pressure EGR passage and for changing a cross-sectional area of the high-pressure EGR passage;
    a valve controller that adjusts openings of the low-pressure EGR valve and the high-pressure EGR valve, the valve controller being operatively coupled to the low-pressure EGR valve and the high-pressure EGR valve; and
    a gear range detector for detecting a gear range of a transmission of a vehicle in which the engine is installed;
    wherein the valve controller is configured to calculate a non-travel range ratio and a travel range ratio that is lower than the non-travel range ratio, the travel and non-travel range ratios being ratios of an amount of exhaust gas recirculated by the high-pressure EGR passage to a total amount of exhaust gas recirculated by the low-pressure EGR passage and the high-pressure EGR passage combined;
    wherein when the gear range detected by the gear range detector is a travel range, the valve controller adjusts the openings of the low-pressure EGR valve and the high-pressure EGR valve so that a ratio of an amount of exhaust gas recirculated by the high-pressure EGR passage to a total amount of exhaust gas recirculated by the low-pressure EGR passage and the high-pressure EGR passage combined becomes the travel range ratio; and
    wherein when the engine is in an idle operation and the gear range detected by the gear range detector is a non-travel range, the valve controller adjusts the openings of the low-pressure EGR valve and the high-pressure EGR valve so that a ratio of an amount of exhaust gas recirculated by the high-pressure EGR passage to a total amount of exhaust gas recirculated by the low-pressure EGR passage and the high-pressure EGR passage combined becomes the non-travel range ratio.

2. The exhaust gas recirculation control system of claim 1, further comprising an intake air temperature detector for detecting a temperature of intake air introduced into the intake passage;
    wherein when the engine is in the idle operation and the temperature of intake air detected by the intake air temperature detector is lower than a predetermined temperature, the valve controller adjusts the opening of the low-pressure EGR valve to be 0% when the gear range detected by the gear range detector is the travel range or the non-travel range.

3. The exhaust gas recirculation control system of claim 2, wherein the high-pressure EGR passage includes:
    a cooler-side passage where a high-pressure EGR cooler for cooling the exhaust gas passing therethrough is disposed; and
    a cooler bypass-side passage bypassing the high-pressure EGR cooler;
    wherein the high-pressure EGR valve includes:
        a cooler-side EGR valve disposed in the cooler-side passage and for changing a cross-sectional area of the cooler-side passage; and
        a cooler bypass-side EGR valve disposed in the cooler bypass-side passage and for changing a cross-sectional area of the cooler bypass-side passage;
    wherein the exhaust gas recirculation control system further comprises a coolant temperature detector for detecting a temperature of a coolant of the engine; and
    wherein the valve controller adjusts the opening of the cooler-side EGR valve to be 0% when the exhaust gas is recirculated by the high-pressure EGR passage when the temperature of the coolant detected by the coolant temperature detector is lower than a predetermined temperature set in advance while the engine is in the idle operation.

4. The exhaust gas recirculation control system of claim 3, further comprising a drive transmitting power reducer for reducing a drive transmitting power of the transmission when the gear range of the transmission is the travel range and a brake pedal is pressed while the engine is in the idle operation;
  wherein when the engine is in the idle operation and the gear range detected by the gear range detector is the travel range and the drive transmitting power is reduced by the drive transmitting power reducer, the valve controller adjusts the openings of the low-pressure EGR valve and the high-pressure EGR valve so that a ratio of an amount of exhaust gas recirculated by the high-pressure EGR passage to a total amount of exhaust gas recirculated by the low-pressure EGR passage and the high-pressure EGR passage combined becomes the non-travel range ratio.

5. The exhaust gas recirculation control system of claim 2, wherein when the engine is in the idle operation and the gear range detected by the gear range detector is the travel range and the detected gear range has continuously been the travel range for over a predetermined period of time, the valve controller adjusts the openings of the low-pressure EGR valve and the high-pressure EGR valve so that a ratio of an amount of exhaust gas recirculated by the high-pressure EGR passage to a total amount of exhaust gas recirculated by the low-pressure EGR passage and the high-pressure EGR passage combined becomes is the non-travel range ratio.

6. The exhaust gas recirculation control system of claim 2, further comprising a drive transmitting power reducer for reducing a drive transmitting power of the transmission when the gear range of the transmission is the travel range and a brake pedal is pressed while the engine is in the idle operation;
  wherein when the engine is in the idle operation and the gear range detected by the gear range detector is the travel range and the drive transmitting power is reduced by the drive transmitting power reducer, the valve controller adjusts the openings of the low-pressure EGR valve and the high-pressure EGR valve so that a ratio of an amount of exhaust gas recirculated by the high-pressure EGR passage to a total amount of exhaust gas recirculated by the low-pressure EGR passage and the high-pressure EGR passage combined becomes the non-travel range ratio.

7. The exhaust gas recirculation control system of claim 1, wherein the high-pressure EGR passage includes:
  a cooler-side passage where a high-pressure EGR cooler for cooling the exhaust gas passing therethrough is disposed; and
  a cooler bypass-side passage bypassing the high-pressure EGR cooler;
    wherein the high-pressure EGR valve includes:
      a cooler-side EGR valve disposed in the cooler-side passage and for changing a cross-sectional area of the cooler-side passage; and
      a cooler bypass-side EGR valve disposed in the cooler bypass-side passage and for changing a cross-sectional area of the cooler bypass-side passage;
    wherein the exhaust gas recirculation control system further comprises a coolant temperature detector for detecting a temperature of a coolant of the engine; and
    wherein the valve controller adjusts the opening of the cooler-side EGR valve to be 0% when the exhaust gas is recirculated by the high-pressure EGR passage when the temperature of the coolant detected by the coolant temperature detector is lower than a predetermined temperature set in advance while the engine is in the idle operation.

8. The exhaust gas recirculation control system of claim 7, wherein when the engine is in the idle operation and the gear range detected by the gear range detector is the travel range and the detected gear range has continuously been the travel range for over a predetermined period of time, the valve controller adjusts the openings of the low-pressure EGR valve and the high-pressure EGR valve so that a ratio of an amount of exhaust gas recirculated by the high-pressure EGR passage to a total amount of exhaust gas recirculated by the low-pressure EGR passage and the high-pressure EGR passage combined becomes the non-travel range ratio.

9. The exhaust gas recirculation control system of claim 7, further comprising a drive transmitting power reducer for reducing a drive transmitting power of the transmission when the gear range of the transmission is the travel range and a brake pedal is pressed while the engine is in the idle operation;
  wherein when the engine is in the idle operation and the gear range detected by the gear range detector is the travel range and the drive transmitting power is reduced by the drive transmitting power reducer, the valve controller adjusts the openings of the low-pressure EGR valve and the high-pressure EGR valve so that a ratio of an amount of exhaust gas recirculated by the high-pressure EGR passage to a total amount of exhaust gas recirculated by the low-pressure EGR passage and the high-pressure EGR passage combined becomes the non-travel range ratio.

10. The exhaust gas recirculation control system of claim 1, wherein when the engine is in the idle operation and the gear range detected by the gear range detector is the travel range and the detected gear range has continuously been the travel range for over a predetermined period of time, the valve controller adjusts the openings of the low-pressure EGR valve and the high-pressure EGR valve so that a ratio of an amount of exhaust gas recirculated by the high-pressure EGR passage to a total amount of exhaust gas recirculated by the low-pressure EGR passage and the high-pressure EGR passage combined becomes the non-travel range ratio.

11. The exhaust gas recirculation control system of claim 1, further comprising a drive transmitting power reducer for reducing a drive transmitting power of the transmission when the gear range of the transmission is the travel range and a brake pedal is pressed while the engine is in the idle operation;
  wherein when the engine is in the idle operation and the gear range detected by the gear range detector is the travel range and the drive transmitting power is reduced by the drive transmitting power reducer, the valve controller adjusts the openings of the low-pressure EGR valve and the high-pressure EGR valve so that a ratio of an amount of exhaust gas recirculated by the high-pressure EGR passage to a total amount of exhaust gas recirculated by the low-pressure EGR passage and the high-pressure EGR passage combined becomes the non-travel range ratio.

12. A turbocharged internal combustion engine having an exhaust gas recirculation (EGR) control system, the control system comprising:
  an exhaust turbocharger having a turbine disposed in an exhaust passage of the engine and a compressor disposed in an intake passage;
  an intercooler disposed in a part of the intake passage downstream of the compressor;
  a low-pressure EGR passage connecting a part of the exhaust passage downstream of the turbine to a part of the intake passage upstream of the compressor;

a low-pressure EGR valve disposed in the low-pressure EGR passage and for changing a cross-sectional area of the low-pressure EGR passage;
a high-pressure EGR passage connecting a part of the exhaust passage upstream of the turbine to a part of the intake passage downstream of the intercooler;
a high-pressure EGR valve disposed in the high-pressure EGR passage and for changing a cross-sectional area of the high-pressure EGR passage;
a valve controller that adjusts openings of the low-pressure EGR valve and the high-pressure EGR valve, the valve controller being operatively coupled to the low-pressure EGR valve and the high-pressure EGR valve; and
a gear range detector for detecting a gear range of a transmission of a vehicle in which the engine is installed;
wherein the intercooler is configured to accumulate therein condensed water produced by exhaust gas recirculating in the low-pressure EGR passage;
wherein the valve controller is configured to calculate a non-travel range ratio and a travel range ratio that is lower than the non-travel range ratio, the travel and non-travel range ratios being ratios of an amount of exhaust gas recirculated by the high-pressure EGR passage to a total amount of exhaust gas recirculated by the low-pressure EGR passage and the high-pressure EGR passage combined;
wherein when the gear range detected by the gear range detector is a travel range, the valve controller adjusts the openings of the low-pressure EGR valve and the high-pressure EGR valve so that a ratio of an amount of exhaust gas recirculated by the high-pressure EGR passage to a total amount of exhaust gas recirculated by the low-pressure EGR passage and the high-pressure EGR passage combined becomes the travel range ratio; and
wherein when the engine is in an idle operation and the gear range detected by the gear range detector is a non-travel range, the valve controller adjusts the openings of the low-pressure EGR valve and the high-pressure EGR valve so that a ratio of an amount of exhaust gas recirculated by the high-pressure EGR passage to a total amount of exhaust gas of the engine recirculated by the low-pressure EGR passage and the high-pressure EGR passage combined becomes the non-travel range ratio, and an accumulation of the condensed water in the intercooler is thereby prevented.

13. A turbocharged internal combustion engine having an exhaust gas recirculation (EGR) control system, the control system comprising:
an exhaust turbocharger having a turbine disposed in an exhaust passage of the engine and a compressor disposed in an intake passage;
an intercooler disposed in a part of the intake passage downstream of the compressor;
a low-pressure EGR passage connecting a part of the exhaust passage downstream of the turbine to a part of the intake passage upstream of the compressor;
a low-pressure EGR valve disposed in the low-pressure EGR passage and for changing a cross-sectional area of the low-pressure EGR passage;
a high-pressure EGR passage connecting a part of the exhaust passage upstream of the turbine to a part of the intake passage downstream of the intercooler;
wherein the high-pressure EGR passage includes:
a cooler-side passage where a high-pressure EGR cooler for cooling the exhaust gas passing therethrough is disposed; and
a cooler bypass-side passage bypassing the high-pressure EGR cooler; and
a high-pressure EGR valve disposed in the high-pressure EGR passage and for changing a cross-sectional area of the high-pressure EGR passage;
wherein the high-pressure EGR valve includes:
a cooler-side EGR valve disposed in the cooler-side passage and for changing a cross-sectional area of the cooler-side passage; and
a cooler bypass-side EGR valve disposed in the cooler bypass-side passage and for changing a cross-sectional area of the cooler bypass-side passage;
a valve controller that adjusts openings of the low-pressure EGR valve and the high-pressure EGR valve, the valve controller being operatively coupled to the low-pressure EGR valve and the high-pressure EGR valve; and
a gear range detector for detecting a gear range of a transmission of a vehicle in which the engine is installed;
wherein the valve controller is configured to calculate a non-travel range ratio and a travel range ratio that is lower than the non-travel range ratio, the travel and non-travel range ratios being ratios of an amount of exhaust gas recirculated by the high-pressure EGR passage to a total amount of exhaust gas recirculated by the low-pressure EGR passage and the high-pressure EGR passage combined;
wherein when the gear range detected by the gear range detector is a travel range, the valve controller adjusts the openings of the low-pressure EGR valve and the high-pressure EGR valve so that a ratio of an amount of exhaust gas recirculated by the high-pressure EGR passage to a total amount of exhaust gas recirculated by the low-pressure EGR passage and the high-pressure EGR passage combined becomes the travel range ratio;
wherein when the engine is in an idle operation and the gear range detected by the gear range detector is a non-travel range, the valve controller adjusts the openings of the low-pressure EGR valve and the high-pressure EGR valve so that a ratio of an amount of exhaust gas recirculated by the high-pressure EGR passage to a total amount of exhaust gas of the engine recirculated by the low-pressure EGR passage and the high-pressure EGR passage combined becomes the non-travel range ratio;
wherein the exhaust gas recirculation control system further comprises a coolant temperature detector for detecting a temperature of a coolant of the engine; and
wherein the valve controller adjusts the opening of the cooler-side EGR valve to be 0% when the exhaust gas is recirculated by the high-pressure EGR passage when the temperature of the coolant detected by the coolant temperature detector is lower than a predetermined temperature set in advance while the engine is in the idle operation.

* * * * *

UNITED STATES PATENT AND TRADEMARK OFFICE
CERTIFICATE OF CORRECTION

PATENT NO. : 9,464,586 B2
APPLICATION NO. : 14/470805
DATED : October 11, 2016
INVENTOR(S) : Kota Maekawa et al.

Page 1 of 1

It is certified that error appears in the above-identified patent and that said Letters Patent is hereby corrected as shown below:

Title page of the patent in item 30 for Foreign Application Priority Data, delete "Sep. 20, 2013" and insert --Sep. 30, 2013--; and In the claims, Column 15, line 25, delete "is".

Signed and Sealed this
Twentieth Day of December, 2016

Michelle K. Lee
*Director of the United States Patent and Trademark Office*